United States Patent
Khan et al.

(10) Patent No.: US 11,077,873 B2
(45) Date of Patent: Aug. 3, 2021

(54) SYSTEM AND METHOD FOR TRAIN ROUTE OPTIMIZATION INCLUDING MACHINE LEARNING SYSTEM

(71) Applicant: Siemens Industry, Inc., Alpharetta, GA (US)

(72) Inventors: Badar K. Khan, Kingston, NY (US); Michael Golm, Princeton, NJ (US); Michael Swieczkowski, Maple Grove, MN (US)

(73) Assignee: Siemens Mobility, Inc., New York, NY (US)

( * ) Notice: Subject to any disclaimer, the term of this patent is extended or adjusted under 35 U.S.C. 154(b) by 350 days.

(21) Appl. No.: 16/309,152

(22) PCT Filed: Jun. 13, 2017

(86) PCT No.: PCT/US2017/037114
§ 371 (c)(1),
(2) Date: Dec. 12, 2018

(87) PCT Pub. No.: WO2017/218447
PCT Pub. Date: Dec. 21, 2017

(65) Prior Publication Data
US 2019/0248394 A1    Aug. 15, 2019

Related U.S. Application Data

(60) Provisional application No. 62/349,357, filed on Jun. 13, 2016.

(51) Int. Cl.
*B61L 27/00* (2006.01)
*G06F 7/00* (2006.01)
(Continued)

(52) U.S. Cl.
CPC ........... *B61L 27/0027* (2013.01); *B61L 3/006* (2013.01); *B61L 25/021* (2013.01); *B61L 25/025* (2013.01);
(Continued)

(58) Field of Classification Search
CPC .. B61L 27/00; B61L 27/0027; B61L 27/0033; B61L 27/0016; B61L 3/006; B61L 25/021; B61L 25/025; B61L 25/04
See application file for complete search history.

(56) References Cited

U.S. PATENT DOCUMENTS

2008/0033605 A1\* 2/2008 Daum ............... B61L 3/006
701/19
2008/0065282 A1\* 3/2008 Daum ............... B61L 27/0027
701/19

(Continued)

OTHER PUBLICATIONS

PCT International Search Report and Written Opinion of International Searching Authority dated Aug. 16, 2017 corresponding to PCT International Application No. PCT/US2017/037114 filed Jun. 13, 2017.

*Primary Examiner* — Jason C Smith

(57) ABSTRACT

A machine learning system (100) for train route optimization includes a machine learning module (120) in communication with an optimization module (110) and including instructions stored in a memory that when executed by a processor (82) cause the machine learning module (120) to receive a plurality of schedules for railroad vehicles travelling through a track network transmitted by the optimization module (110), prioritize the plurality of schedules by applying at least one business rule (140) to the plurality of schedules based on dynamically learned behavior, and provide a prioritized list of schedules.

13 Claims, 2 Drawing Sheets

(51) Int. Cl.
*B61L 3/00* (2006.01)
*G01C 21/34* (2006.01)
*B61L 25/02* (2006.01)
*B61L 25/04* (2006.01)

(52) U.S. Cl.
CPC ........... *B61L 25/04* (2013.01); *B61L 27/0016* (2013.01); *G01C 21/3446* (2013.01); *G06F 7/00* (2013.01)

(56) References Cited

U.S. PATENT DOCUMENTS

| | | | | |
|---|---|---|---|---|
| 2010/0262321 | A1* | 10/2010 | Daum | B61L 15/0081 |
| | | | | 701/20 |
| 2015/0232109 | A1* | 8/2015 | Dymek | B61L 15/0072 |
| | | | | 701/19 |
| 2019/0193765 | A1* | 6/2019 | Khan | B61L 27/0016 |
| 2019/0248394 | A1* | 8/2019 | Khan | B61L 25/04 |

* cited by examiner

SYSTEM AND METHOD FOR TRAIN ROUTE OPTIMIZATION INCLUDING MACHINE LEARNING SYSTEM

CROSS REFERENCE TO RELATED APPLICATIONS

This Application is the U.S. National Stage of International Application No. PCT/US2017/037114 filed 13 Jun. 2017 which claims benefit of U.S. Provisional Patent Application No. 62/349,357 filed 13 Jun. 2016 in the United States Patent and Trademark Office, the contents of which are herein incorporated by reference in their entirety.

BACKGROUND

1. Field

Aspects of the present invention generally relate to a method and a system for train route optimization including a machine learning system.

2. Description of the Related Art

Railroad transportation systems, in particular freight transportation systems, are becoming more competitive and railroad transportation system operators are looking for ways to optimize track usage. This has led to for example in an increase in number of railroad vehicles (trains) and/or length(s) of railroad vehicles within a railroad track network. Further, the railroad vehicles must be scheduled and routed through the track network based on for example a schedule, which can be very complex due to a large track network and a large number of railroad vehicles.

In today's world it is no longer enough to only route trains through the track network but also to consider the track network holistically and to consider different business aspects, for example of a railroad transportation system operator, that impact priorities to trains being routed through the track network. For example, track network planning systems may need to be able to present possible optimized plans/schedules, while evolving and learning business decisions alongside human operators. With the power and ability of computing machines to crunch through data and learn patterns, planning systems can become even more powerful with the help of human operators. While the machines have the ability to identify patterns, human operators are able to interrupt the pattern and data to recommend a course of action that achieves business objects and closely align decisions with changing needs of the railroad business.

SUMMARY

Briefly described, aspects of the present invention relate to a method, a system and a computer readable medium for train route optimization including a machine learning system. In an embodiment, the method, system and computer readable medium relate to real-time (re)-scheduling of railroad vehicles, for example when an expected event occurs within the track network and the railroad vehicles are late to a station and need to be re-routed. The method, system and computer readable medium can be applied to freight transportation systems but also to passenger transportation systems including multiple railroad vehicles, herein also referred to as trains, within a railroad track network, herein also referred to as track network.

The provided method and system are based on a two-stage approach generating one or more possible solutions, the solutions being for example train schedules. In a first stage, train routes/schedules are optimized, for example based on evolutionary-based learning techniques, which start with random assumptions and build towards solution sets based on loosely built constraints. An example for such techniques is a genetic algorithm, herein referred to as GA. In a second stage, a set of solutions generated during the first stage, are fed into a machine learning module which processes and prioritizes the solutions by applying filters based on business objectives. Depending on a mode of the machine learning system, the machine learning module can be configured to continuously learn and evolve based on input of a human operator.

A first aspect of the present invention provides a machine learning system for train route optimization comprising a machine learning module in communication with an optimization module and including instructions stored in a memory that when executed by a processor, for example a graphics processing unit, cause the machine learning module to receive a plurality of schedules for railroad vehicles travelling through a track network transmitted by the optimization module, prioritize the plurality of schedules by applying at least one business rule to the plurality of schedules based on dynamically learned behavior, and provide a prioritized list of schedules.

A second aspect of the present invention provides a method for optimizing a schedule for railroad vehicles travelling within a railroad network performed by a machine learning system, through operation of at least one processor, comprising receiving, by a machine learning module in communication with an optimization module, a plurality of schedules for railroad vehicles travelling through a track network transmitted by the optimization module, prioritizing, by the machine learning module, the plurality of schedules by applying at least one business rule to the plurality of schedules based on dynamically learned behavior, and providing, by the machine learning module, a prioritized list of schedules.

A third aspect of the present invention provides a non-transitory computer readable medium comprising computer instructions capable of being executed in at least one processor and performing the method of optimizing a schedule for railroad vehicles travelling within a railroad network performed by a machine learning system.

DETAILED DESCRIPTION

To facilitate an understanding of embodiments, principles, and features of the present invention, they are explained hereinafter with reference to implementation in illustrative embodiments. In particular, they are described in the context of being a method, a system and a computer readable medium for train route optimization including a machine learning system, for example for a freight transportation system. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
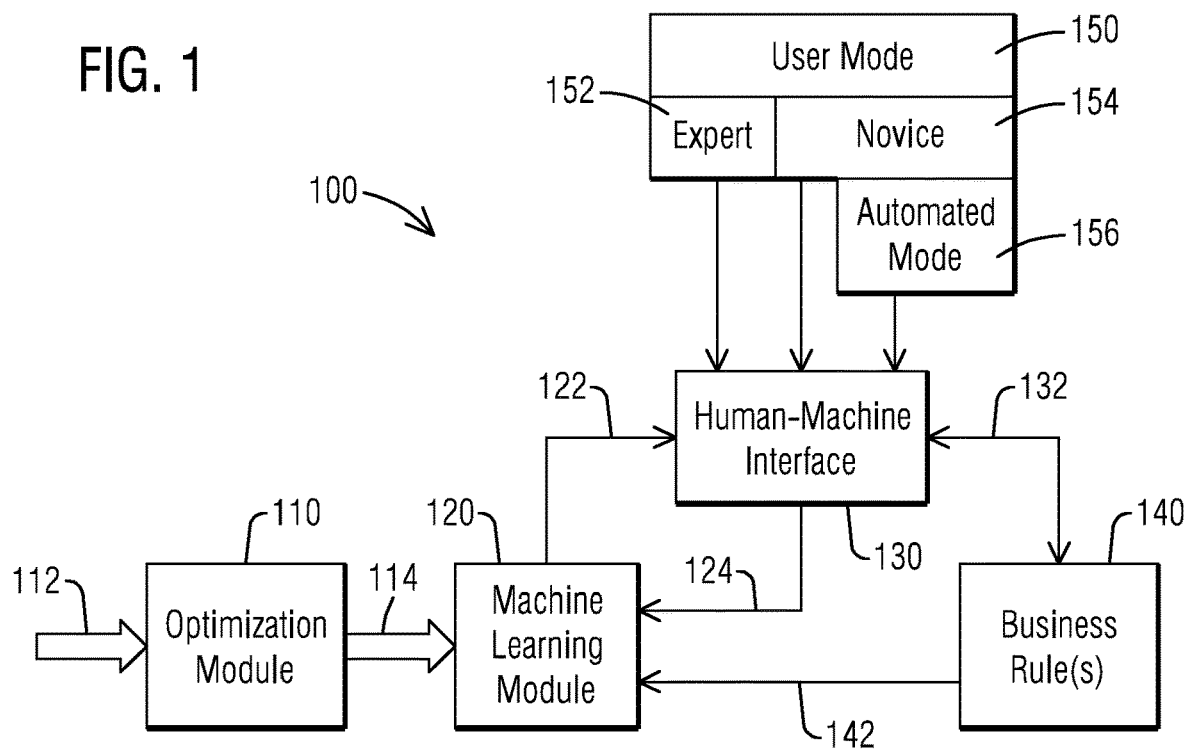
FIG. 1 illustrates a first graphical representation of a machine learning system for train route optimization in accordance with an exemplary embodiment of the present invention.

FIG. 1 illustrates a graphical representation of a machine learning system 100 for train route optimization in accordance with an exemplary embodiment of the present invention.

The machine learning system 100 is based on a two-stage approach for generating one or more optimized and adapted train schedules. In a first stage, train routes/schedules are optimized by an optimization module 110, for example based on evolutionary-based learning techniques, which start with random assumptions and build towards solution sets based on loosely built constraints. An example for such a technique is a genetic algorithm (GA). In a second stage, a set of solutions generated during the first stage, are fed into a machine learning module 120 which processes and prioritizes possible solutions by applying filters based on one or more business rules/objectives. The learning machine module 120 can be configured to continuously learn and evolve based on input of a human operator.

In the first stage, different data and information are provided as input 112 to the optimization module 110. Input 112 comprises for example an initial population of initial schedules, wherein the initial schedules comprise first information and data of a railroad track network and second information of railroad vehicles (trains) travelling in the railroad track network. The first information of the railroad track network includes one or more parameters comprising identification of track component, track name, track length, track occupied/unoccupied, or cost of track usage and wherein the second information of the railroad vehicles includes one or more parameters comprising identification of the at least one railroad vehicle, train name, train speed, train length, travelling time, delay time, or train priority. The information and data relating to the trains travelling in the track network is herein referred to as train schedules or schedules. At least one of the initial schedules comprises delays of one or more trains travelling in the track network. As noted before the provided method and system relate to real-time (re)-scheduling of trains, for example when an expected event occurs within the track network and the trains are late to a station and need to be re-routed. An output 114 of the optimization module 110 includes a final population of final schedules generated based on the initial population of initial schedules. The output 114 comprises multiple possible solutions of optimized train schedules.

An objective of the optimization module 110 (and also of the machine learning system 100) can be to find or generate optimized train schedule(s) that routes all trains from defined source station(s) to defined destination station(s) in the track network as fast as possible and without collision(s) of the trains within the track network. An example for an optimization module 110 will be described in more detail with reference to FIG. 2. Output 114 of the optimization module 110 is input to the machine learning module 120, i.e. output 114 is provided to and fed into the machine learning module 120.

The machine learning system 100 further includes a business rule input comprising at least one business rule 140. A business rule 140 as described herein includes for example business goals, objectives or aims of a user or operator that utilizes the system 100. A user or operator can be for example a track network operator, a railroad operator and/or an operator providing train schedules for the track network. Each of the operators may have specific business goals or objectives with regard to the track network and/or trains. For example, a business rule 140 may be to provide a train schedule that is optimized for travelling time of the trains, i.e. route all trains from a defined source station to a defined destination station in the track network as fast as possible. Another example for a business rule 140 may be to optimize for track usage, i.e. occupy and use all tracks of the track network equally. However, common to all business rules 140 is track conflict mitigation, i.e. to provide train schedule(s) avoiding or minimizing train collisions.

The system 100 further comprises a human-machine-interface (HMI) 130, herein also referred to as user interface 130. The user interface 130 is configured to display data and information provided by the machine learning module 120 to a user or operator that is specifically a human operator. The user interface 130 comprises a type of display, screen or panel to graphically display the output of the machine learning module 120. The user interface 130 is further configured to permit the user or operator to modify, adapt, enter or delete data and information in the machine learning system 100.

As noted before, the output 114 of the optimization module 110 is fed into the machine learning module 120. The output 114 comprising the set of possible solutions for train schedules is then prioritized (ranked, ordered or listed) in view of one or more business rules 140. The machine learning module 120 is applying at least one business rule 140 to the plurality of schedules (possible solutions) based on dynamically learned behaviour, and then provides a prioritized list of schedules to the user or operator via the user interface 130.

In order to apply the business rule 140, certain instructions and information must be learned. Business rule(s) or objectives 140 can be learned by different methods. In an embodiment, the machine learning module 120 dynamically learns the business rule 140 by machine-human learning through HMI 130 with the user or operator. In other words, the human operator is put in the loop of the process and learning is build based on decisions/modifications by the operator.

The user interface 130 is configured to display the prioritized list of schedules provided by the machine learning module 120, and is further configured to permit a user or operator to modify the prioritized list of schedules in view of the at least one business rule 140. In an example, the machine learning module 120 may receive a set of 20 possible solutions including schedules nos. 1, 2, . . . 20 generated by the optimization module 110. At first, when the machine learning module 120 has not yet learned and applied the business rule 140, a prioritized list of schedules may correspond to the set of possible schedules provided by the optimization module 110. Of course, the set of possible solutions can comprise more or less than 20 schedules. The user has now the ability to modify or change the prioritized list via the user interface 130 and to provide intelligent recommendations. The user may need to modify the list because the machine learning module 120 may not have considered all aspects of the applied business rule 140 or the business rule 140 itself has changed. The machine learning module 120 is configured such that it modifies the prioritized list of schedules based on instructions received from the user. For example, in view of the applied business rule 140 which includes track conflict mitigation, the user may modify the list of schedules so that schedule no. 7 is first priority, schedule no. 15 second priority and so on. Schedule no. 7 is chosen by the operator because it may mitigate the most conflicts on the track while also being in accordance with the business rule 140.

The machine learning module 120 is configured to learn the modifications and decision made by the operator when applying the business rule 140. For example, the machine learning module 120 can comprise a neural network or other type of algorithm to learn the business rule 140. During each iteration of the process, the machine learning module 120 learns more of the business rule 140 and evolves and provides an improved prioritized list of schedules in view of the business rule 140.

In the described embodiment, the machine learning system 100 provides supervised continuous/constant learning of the machine learning module 120 based on input by the user or operator. The more iterations of the method are conducted, the better the machine learning module 120 learns the business rule. For example, in view of track conflict mitigation, when the machine learning module 120 applies the business rule 140 (without operator interaction), the machine learning module 120 is able to evaluate a number of conflicts (possible collisions of trains on a specific track) removed from the schedule(s). The machine learning module 120 is then able to modify/adapt priorities of the schedules, along with other aspects of the specific business rule 140, and to provide intelligent system recommendation(s) as to which schedule(s) presents the best solution for routing the trains through the track network under the specific circumstances.

Another possibility to learn a business rule 140 by the machine learning module 120 is to learn to business rule based on a training set of data built from an expert operator or historical data. For example, an expert operator of the system has chosen specific train schedules in view of a specific business rule, for example to resolve delayed train schedules, wherein decisions and modification made by the expert operator are stored and used to build a training set of data. The training data and/or historical data may be used for upfront learning of the machine learning module 120.

In another exemplary embodiment of the machine learning system 100, the system comprises a user mode input 150. Different modes of operation, specifically expert mode 152 or novice mode 154, are available based on the operator making the decisions for track conflict mitigation. In case of the novice mode 154, the prioritized list of schedules presented is based on training set of data which was built from the expert operator. In the novice operator mode 154, only the schedule with the first priority may be displayed to the operator, wherein in the expert mode 152, the complete list with prioritized schedules may be presented to the operator in order for the operator to further modify/adapt the list of prioritized schedules. In the novice mode 154, a learning of the machine learning module 120 may not occur.

In another exemplary embodiment, aspects of the user mode input 150 may be automated. For example, the novice mode 154 may comprise additional modes including for example an automated mode 156. In the regular novice mode 154, i.e. non-automated, the novice user is given the capability to modify the list of schedules, but as more confidence is built, the system 100 can be switched to the automated mode 156. In the automated mode 156, the system 100 automatically selects and presents the schedule with the first priority to the operator.

In summary, the machine learning system 100 is a hybrid system that learns business rules or objectives 140 based on operator's selections and decisions and tweaks recommendations that are closer to the business rule 140 of the operator. The learning system 100 provides a holistic approach for optimized train schedules based on the track network and input schedules with delays. Instead of building the learning system 100 for each different customer with a different business objective 140, the system 100 learns the specific business rule 140 by the human operator training the system 100 and module 120.

Figure 2:
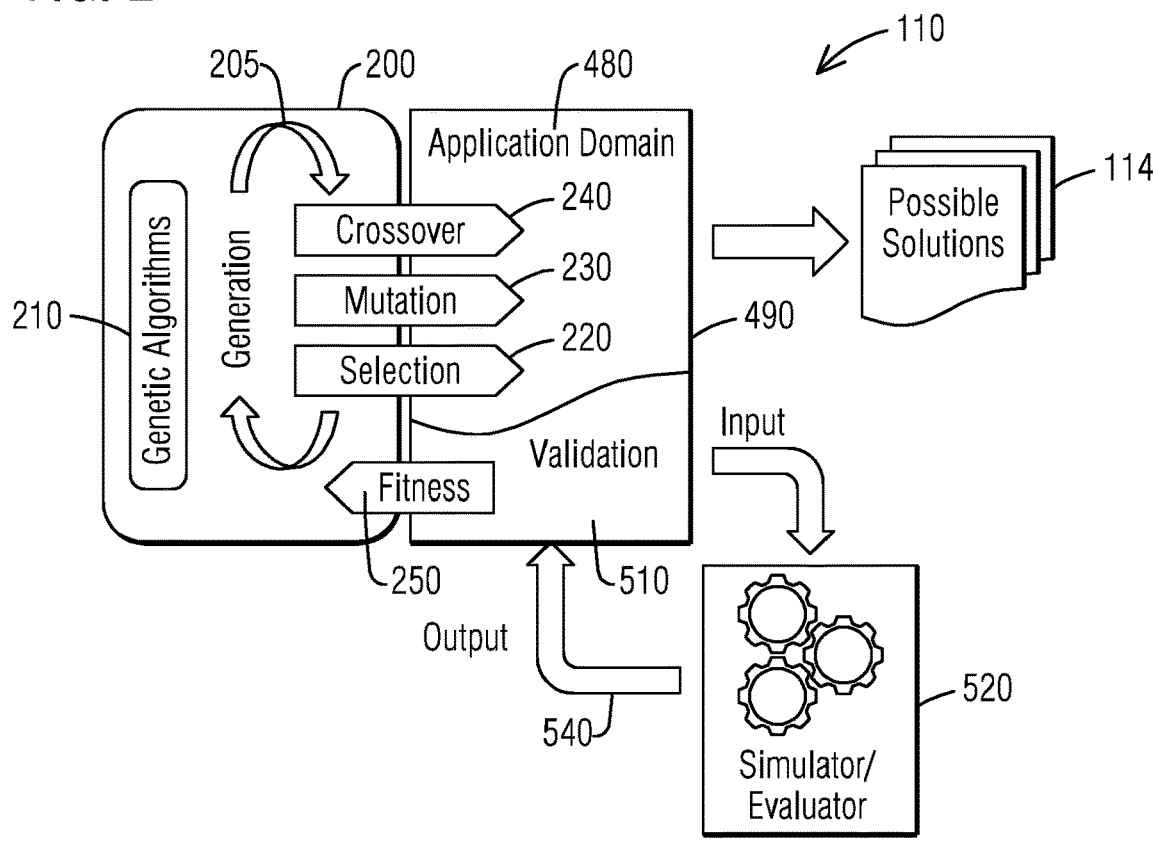
FIG. 2 illustrates a graphical representation of an optimization module including a genetic algorithm in accordance with an exemplary embodiment of the present invention.

FIG. 2 illustrates a graphical representation of an optimization module 110 including a genetic algorithm in accordance with an exemplary embodiment of the present invention. Route optimization, in particular train route optimization, lends well to a form of self-learning problem utilizing a genetic algorithm (GA) which can look at a problem holistically and consider different constraints to learn a best route for many trains through a track network. A GA, compared to other classes of evolutionary algorithms (EA), provides simplicity and ease of transformation which allow for implementations that create robust representations of structures to be optimized. Genetic algorithms are commonly used to generate high-quality solutions to optimization and search problems by relying on bio-inspired operators such as mutation, crossover and selection.

It should be noted that one of ordinary skill in the art is familiar with genetic algorithms. In summary, a GA usually starts from a population of randomly generated individuals or members, and is an iterative process, wherein the population of each iteration is called a generation. The population of individuals or members encodes candidate solutions to an optimization problem, which then evolve to create better solutions. In each generation, fitness of every individual or member in the population can be evaluated using a fitness function. The fitness function is usually related to an objective function in the optimization problem being solved. During a selection, the more fit individuals or members are selected, for example stochastically, from the current population, and are prime candidates for parents. The parents are then reproduced by applying reproduction operators such as crossover and/or mutation, to create a set of children, an offspring. The offspring replaces the current population, see replacement, and are used in a next iteration of the GA. Commonly, the GA terminates when either a maximum number of generations has been produced, or a satisfactory fitness level has been reached for the population.

Optimization module 110 comprises the initial population 200 with multiple parents configured as schedules. The initial population 200 as well as any further population is considered as a generation 205. During an iteration of the GA 210 using selection 220, mutation 230 and/or crossover 240, the final population 480, for example within an application domain 490, is created.

In an exemplary embodiment, the optimization module 110 provides isolation between the GA 210 and the specific application of the application domain 490, in our case the train route optimization. A validation 510 abstracts away type and number of simulators (selection 220, mutation 230, and crossover 240) that were used to influence a fitness function of the GA 210, allowing experimentation with different simulators/evaluators. Validation 510 and/or simulation of the final population 480 can be performed using a simulator/evaluator tool 520. Generated final population 480 provides input 530 to the simulator tool 520, and performed validation and/or simulation results are provided as output 540, for example to determine fitness 250 of each schedule of the final population 480. The system 110 generates a best solution for each iteration for diagnostic purposes to possibly observe paths that the GA 210 took to reach final possible solutions 114. Further details of an optimization module 110 or optimization system are described in International patent application with filing number PCT/US2017/032581 and filing date May 15, 2017, which entire content is incorporated herein by reference.

It should be noted that many other algorithms or systems may be used by the optimization module 110 depending on for example the size of the track network and number of trains. The optimization module 110 as described with reference to FIG. 2 is suitable for large track networks comprising for example several thousand miles of tracks. For small track networks, optimization systems, programs, languages and/or algorithms such as Planning Domain Definition Language (PDDL) in combination with satisfiability modulo theories (SMT, SAT) may be used for providing a set of possible solutions 114.

Figure 3:
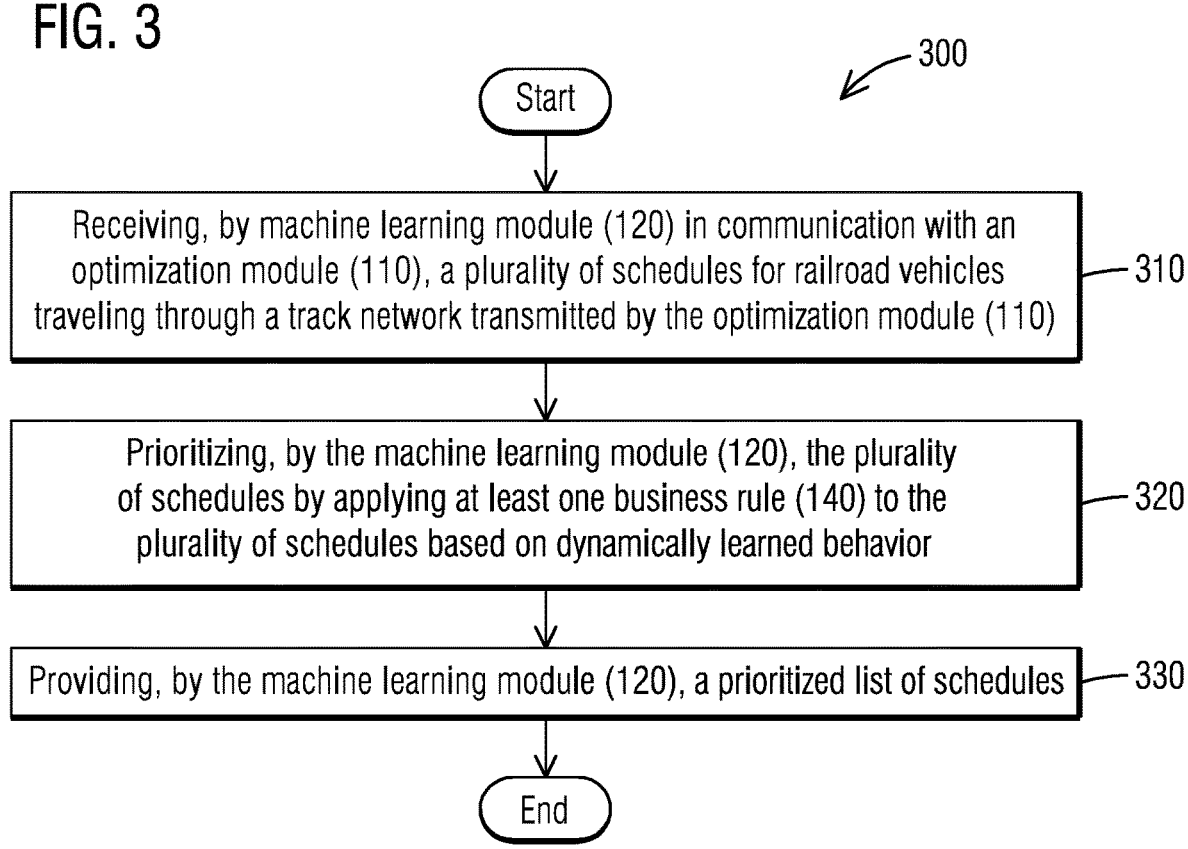
FIG. 3 illustrates a flow chart of a method for a machine learning system in accordance with an exemplary embodiment of the present invention.

FIG. 3 illustrates a flow chart of a method 300 for optimizing a schedule for railroad vehicles travelling within a railroad network performed by a machine learning system 100, through operation of at least one processor 82, in accordance with an exemplary embodiment of the present invention. Summarizing, the method 300 comprises, in step 310, receiving, by the machine learning module 120 in communication with an optimization module 110, a plurality of schedules for railroad vehicles travelling through a track network transmitted by the optimization module 110. In step 320, the plurality of schedules are prioritized, by the machine learning module 120, by applying at least one business rule 140 to the plurality of schedules based on dynamically learned behaviour. Step 330 comprises providing, by the machine learning module 120, a prioritized list of schedules.

Figure 4:
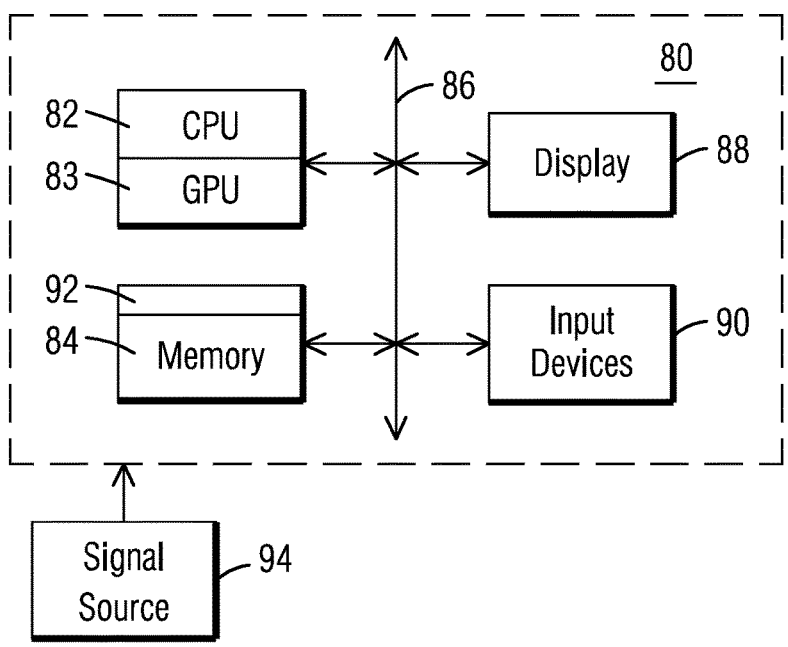
FIG. 4 illustrates a high level block diagram of a computer for implementing the described method and system in accordance with an exemplary embodiment of the present invention.

FIG. 4 illustrates a high level block diagram of a computer 80 for implementing the described method and system in accordance with an exemplary embodiment of the present invention.

The described method and system for train route optimization may be implemented by using the computer 80. The computer 80 includes software, hardware and drivers for performing the method and implementing the system for train route optimization. The computer 80 may use well-known computer processors, memory units, storage devices, computer software, and other components. Computer 80 may include a central processing unit (CPU) 82, a memory 84 and an input/output (I/O) interface 86. In an embodiment, the computer 80 comprises a graphics processing unit (GPU) 83, specifically for running machine learning training of the machine learning system 100 and the machine learning module 120 (see for example FIG. 1). The computer 80 including the GPU 83 provides a platform/system particularly suitable for machine learning systems, i.e. machine learning systems 100 perform well on a platform including a GPU 83. The computer 80 is generally coupled through the I/O interface 86 to a display 88 for visualization and various input devices 90 that enable user interaction with the computer 80 such as a keyboard, keypad, touchpad, touchscreen, mouse, speakers, buttons or any combination thereof. Support circuits may include circuits such as cache, power supplies, clock circuits, and a communications bus. The memory 84 may include random access memory (RAM), read only memory (ROM), disk drive, tape drive, etc., or a combination thereof. Embodiments of the present disclosure may be implemented as a routine 92 that is stored in memory 84 and executed by the CPU 82 to process the signal from a signal source 94. As such, the computer 80 is a general purpose computer system that becomes a specific purpose computer system when executing the routine 92. The computer 80 can communicate with one or more networks such as a local area network (LAN), a general wide area network (WAN), and/or a public network (e.g., the Internet) via a network adapter. One skilled in the art will recognize that an implementation of an actual computer could contain other components as well, and that FIG. 4 is a high level representation of some of the components of such a computer for illustrative purposes.

The computer 80 also includes an operating system and micro-instruction code. The various processes and functions described herein may either be part of the micro-instruction code or part of the application program, or a combination thereof, which is executed via the operating system. In addition, various other peripheral devices may be connected to the computer platform such as an additional data storage device and a printing device. Examples of well-known computing systems, environments, and/or configurations that may be suitable for use with computer 80 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The method and system of the figures are not exclusive. Other systems, processes and menus may be derived in accordance with the principles of the present invention to accomplish the same objectives. Although the present invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof.

The invention claimed is:

1. A machine learning system for train route optimization comprising:
   a machine learning module in communication with an optimization module and including instructions stored in a memory that when executed by a processor cause the machine learning module to:
      receive a plurality of schedules for railroad vehicles travelling through a track network transmitted by the optimization module,
      prioritize the plurality of schedules by applying at least one business rule to the plurality of schedules based on dynamically learned behavior, and
      provide a prioritized list of schedules,
   wherein the optimization module is configured to generate the plurality of schedules by optimizing initial schedules utilizing a genetic algorithm, wherein the initial schedules comprise at least one schedule with delays of one or more railroad vehicles travelling in the railroad network.

2. The machine learning system of claim 1, wherein the dynamically learned behavior is based on instructions and decisions provided by a human operator.

3. The machine learning system of claim 1, further comprising:
   a human-machine-interface (HMI) configured to display the prioritized list of schedules provided by the machine learning module, and to permit a user to modify the prioritized list of schedules in view of the at least one business rule.

4. The machine learning system of claim 3, wherein the instructions, when executed by the processor, further cause the machine learning module to:
   modify the prioritized list of schedules based on instructions received from the user via the HMI.

5. The machine learning system of claim 1, wherein the at least one business rule includes mitigation of track conflicts of one or more railroad vehicles travelling on a same railroad track.

6. The machine learning system of claim 1, wherein the instructions, when executed by the processor, further cause the machine learning module to:
   analyze the plurality of schedules by evaluating a number of conflicts removed from each schedule.

7. The machine learning system of claim 1, further comprising:
   a user mode input comprising an expert user mode and a novice user mode, wherein the dynamically learned behavior of the machine learning module is based on input and instructions provided during expert user mode.

8. The machine learning system of claim 7, wherein, during the novice user mode, the machine learning module is configured to prioritize the plurality of schedules based on a training set of expert data stored within the machine learning module.

9. A method for optimizing a schedule for railroad vehicles travelling within a railroad network performed by a machine learning system, through operation of at least one processor, comprising:
   receiving, by a machine learning module in communication with an optimization module, a plurality of schedules for railroad vehicles travelling through a track network transmitted by the optimization module,
   prioritizing, by the machine learning module, the plurality of schedules by applying at least one business rule to the plurality of schedules based on dynamically learned behavior, and
   providing, by the machine learning module, a prioritized list of schedules, and further comprising
   generating, by the optimization module, the plurality of schedules using a genetic algorithm, comprising:
      providing an initial population of initial schedules, each schedule comprising first information of a railroad track network and second information of at least one railroad vehicle travelling in the railroad track network for a time instance,
      selecting at least two schedules of the initial schedules, and
      generating a final population of final schedules utilizing crossover operation between selected initial schedules, wherein the second information of the at least one railroad vehicle travelling in the railroad track network are exchanged between the selected initial schedules.

10. The method of claim 9, wherein the first information of the railroad track network includes one or more parameters comprising identification of track component, track name, track length, track occupied/unoccupied, or cost of track usage and wherein the second information of the railroad vehicles includes one or more parameters comprising identification of the at least one railroad vehicle, train name, train speed, train length, travelling time, delay time, or train priority.

11. The method of claim 9, wherein the initial population comprises at least one schedule with delays of one or more railroad vehicles travelling within the railroad track network.

12. The method of claim 9, further comprising:
   providing a human-machine-interface configured to display the prioritized list of schedules provided by the machine learning module, and to permit a user to modify the prioritized list of schedules in view of the at least one business rule.

13. A non-transitory computer readable medium comprising computer instructions capable of being executed in at least one processor and performing the method as claimed in claim 9.

* * * * *